(12) United States Patent
Komatsu

(10) Patent No.: US 9,891,415 B2
(45) Date of Patent: *Feb. 13, 2018

(54) ZOOM LENS AND IMAGING APPARATUS

(71) Applicant: FUJIFILM Corporation, Tokyo (JP)

(72) Inventor: Daiki Komatsu, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/262,078

(22) Filed: Sep. 12, 2016

(65) Prior Publication Data

US 2017/0082838 A1 Mar. 23, 2017

(30) Foreign Application Priority Data

Sep. 18, 2015 (JP) .................................. 2015-185014

(51) Int. Cl.
*G02B 15/14* (2006.01)
*G02B 15/163* (2006.01)

(52) U.S. Cl.
CPC .................................. *G02B 15/163* (2013.01)

(58) Field of Classification Search
CPC .................................................. G02B 15/163
USPC ......................................................... 359/676
See application file for complete search history.

(56) References Cited

U.S. PATENT DOCUMENTS

| 5,303,086 A | * | 4/1994 | Mori | G02B 15/163 |
| | | | | 359/683 |
| 2006/0285224 A1 | | 12/2006 | Endo et al. | |
| 2012/0002300 A1 | | 1/2012 | Kodaira | |
| 2013/0271849 A1 | | 10/2013 | Hori | |
| 2017/0082839 A1 | * | 3/2017 | Komatsu | G02B 15/163 |

FOREIGN PATENT DOCUMENTS

| JP | 2006-349947 A | 12/2006 |
| JP | 2012-013817 A | 1/2012 |
| JP | 2013-221999 A | 10/2013 |

* cited by examiner

*Primary Examiner* — Alicia M Harrington

(74) *Attorney, Agent, or Firm* — Studebaker & Brackett PC

(57) ABSTRACT

A zoom lens is constituted by, in order from the object side to the image side: a positive first lens group; a positive second lens group; a negative third lens group; a negative fourth lens group; and a positive fifth lens group. The first lens group and the fifth lens group are fixed with respect to an image formation plane while the second lens group, the third lens group, and the fourth lens group move to change the distances among adjacent lens group when changing magnification. Conditional Formula (1) below is satisfied.

$$2.1 < DL3/DL2 < 20 \qquad (1)$$

17 Claims, 9 Drawing Sheets

FIG.6
EXAMPLE 2
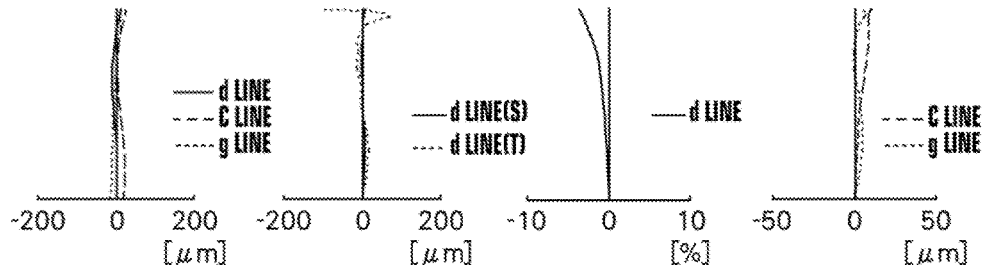
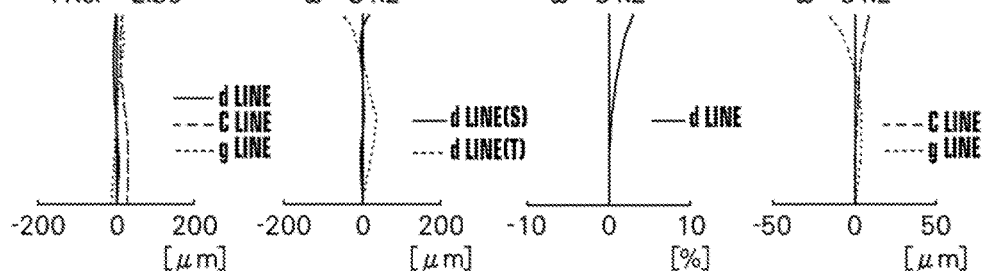
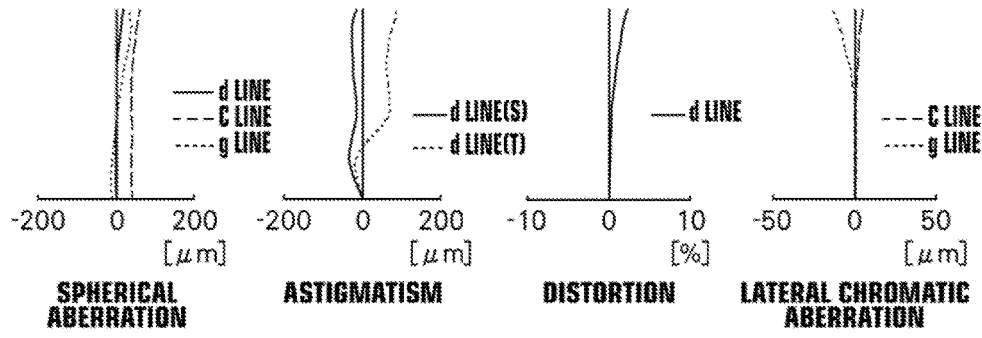

FIG.7
EXAMPLE 3
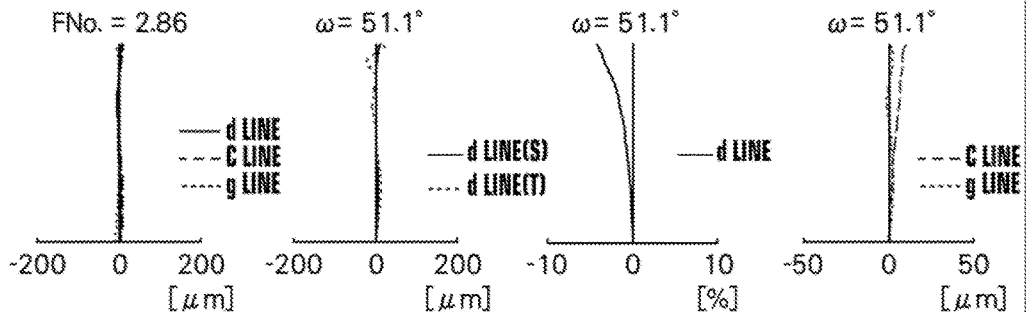
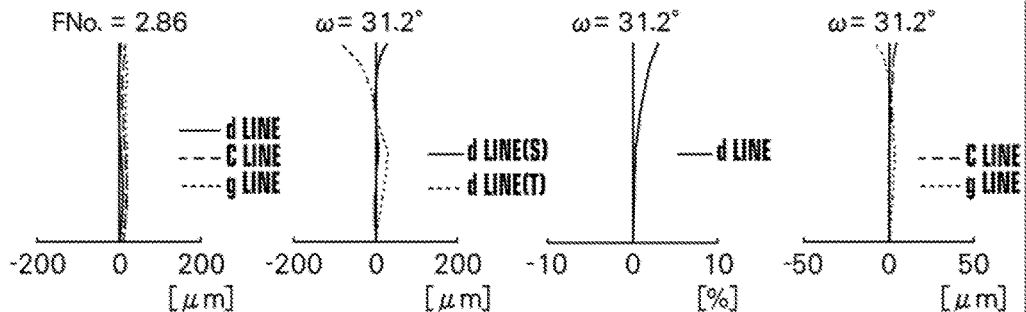
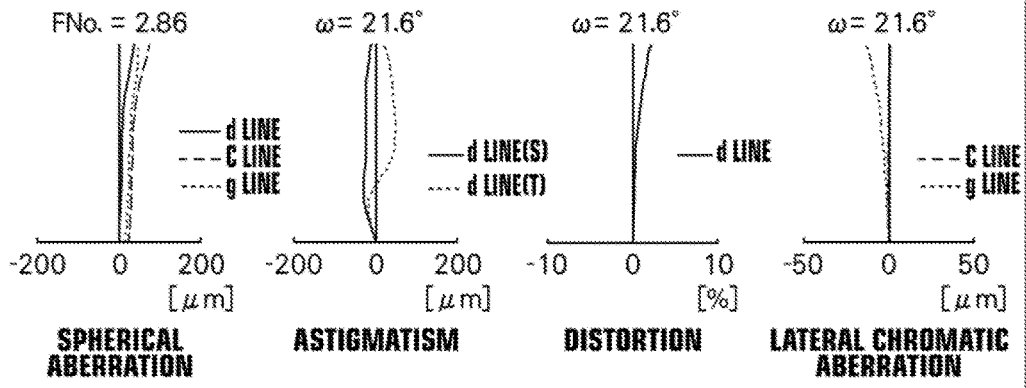

FIG.8
EXAMPLE 4
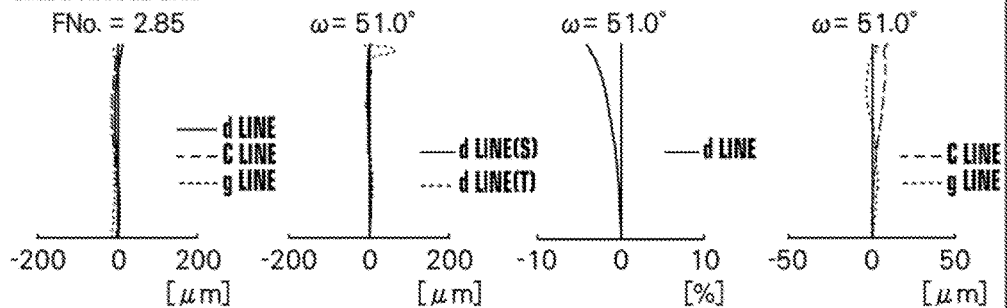
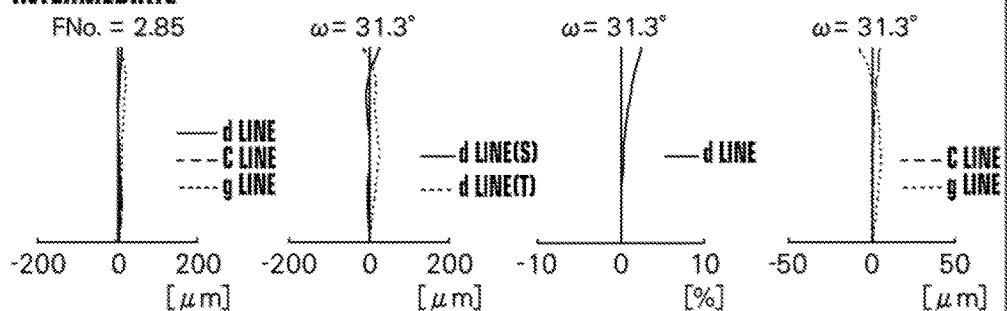
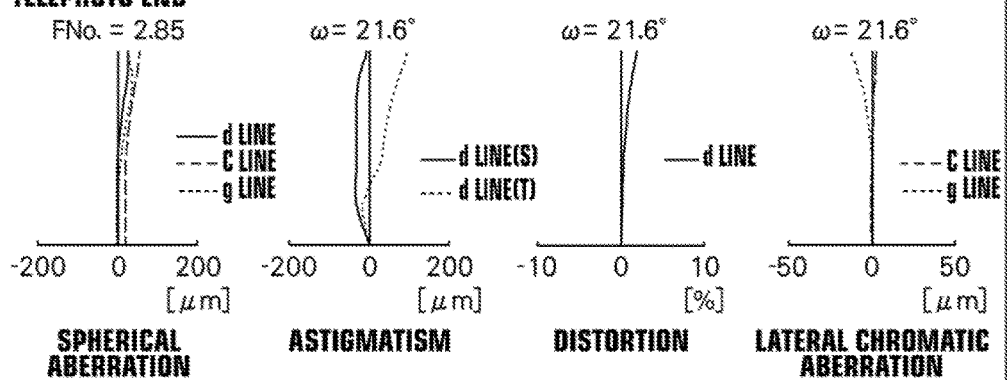

ZOOM LENS AND IMAGING APPARATUS

CROSS REFERENCE TO RELATED APPLICATIONS

The present application claims priority under 35 U.S.C. §119 to Japanese Patent Application No. 2015-185014 filed on Sep. 18, 2015. The above application is hereby expressly incorporated by reference in its entirety, into the present application.

BACKGROUND

The present disclosure is related to a zoom lens which can be utilized in electronic cameras such as a digital camera, a video camera, a broadcast camera, a cinematic camera, a surveillance camera, etc., and to an imaging apparatus equipped with this zoom lens.

The zoom lenses disclosed in Japanese Unexamined Patent Publication Nos. 2013-221999, 2012-013817, and 2006-349947 are proposed as zoom lenses to be employed in electronic cameras such as a digital camera, a video camera, a broadcast camera, a cinematic camera, a surveillance camera, etc.

SUMMARY

Conventional broadcast cameras perform imaging according to the HD (High Definition) standard, and the maximum resolution thereof had been Full HD (1920×1080 pixels). Recently, there are many cameras which are compatible with the 4K standard (3840×2160 pixels, for example) which has approximately four times the number of pixels of Full HD, and imaging employing such cameras is increasing. Further, there are cameras which are compatible with the Super High Vision standard, which has an even greater number of pixels than 4K. High performance lenses are desired for these high pixel number cameras.

However, the lenses disclosed in Japanese Unexamined Patent Publication No. 2013-221999 include many having comparatively wide angles of view, but it cannot be said that these lenses sufficiently correct aberrations. In addition, the lenses disclosed in Japanese Unexamined Patent Publication No. 2012-013817 have sufficiently wide angles of view, but it cannot be said that the lenses are sufficiently miniaturized with respect to image size. Further, the lenses of Examples 7 and 8 of Japanese Unexamined Patent Publication No. 2006-349947 have zoom lenses with refractive powers which are positive, negative, and positive in this order from the object side to the image side, have short back focus, and it cannot be said that various aberrations are favorably corrected.

The present disclosure has been developed in view of the foregoing circumstances. The present disclosure provides a high performance zoom lens which has a comparatively long back focus, is compact, has a wide angle of view, and favorably corrects various aberrations. The present disclosure also provides an imaging apparatus equipped with this zoom lens.

A zoom lens of the present disclosure consists of, in order from the object side to the image side:
a first lens group having a positive refractive power;
a second lens group having a positive refractive power;
a third lens group having a negative refractive power;
a fourth lens group having a negative refractive power; and
a fifth lens group having a positive refractive power;
the first lens group and the fifth lens group being fixed with respect to an image formation plane while the second lens group, the third lens group, and the fourth lens group move to change the distances among adjacent lens group when changing magnification; and Conditional Formula (1) below being satisfied:

$$2.1 < DL3/DL2 < 20 \tag{1}$$

wherein DL3 is the range of movement of the third lens group, and DL2 is the range of movement of the second lens group.

Here, the "range of movement" refers to the amount of displacement from the position most toward object side to the position most toward the image side of each lens group when changing magnification from the wide angle end to the telephoto end.

Note that it is more preferable for Conditional Formula (1-1) below to be satisfied.

$$2.2 < DL3/DL2 < 17 \tag{1-1}$$

In the zoom lens of the present disclosure, it is preferable for Conditional Formula (2) below to be satisfied. Note that it is more preferable for Conditional Formula (2-1) below to be satisfied.

$$0.4 < f3/f4 < 0.8 \tag{2}$$

$$0.5 < f3/f4 < 0.7 \tag{2-1}$$

wherein f3 is the focal length with respect to the d line of the third lens group, and f4 is the focal length with respect to the d line of the fourth lens group.

In addition, it is preferable for the third lens group to have two cemented lenses, for at least one of the cemented lenses to consist of a positive lens and a negative lens, and for Conditional Formula (3) below to be satisfied. In this case, it is preferable for the cemented lens provided most toward the image side within the third lens group to satisfy Conditional Formula (3). Note that it is more preferable for Conditional Formula (3-1) to be satisfied.

$$0 < vd3p - vd3n < 10 \tag{3}$$

$$4 < vd3p - vd3n < 10 \tag{3-1}$$

wherein vd3p is the Abbe's number with respect to the d line of the positive lens of the cemented lens consisting of a positive lens and a negative lens within the third lens group, and vd3n is the Abbe's number with respect to the d line of the negative lens of the cemented lens consisting of a positive lens and a negative lens within the third lens group.

In addition, it is preferable for the first lens group to consist of, in order from the object side to the image side: a 1a lens group having a negative refractive power; a 1b lens group having a positive refractive power; and a 1c lens group having a positive refractive power; and for the 1a lens group and the 1c lens group to be fixed with respect to the image formation plane while the 1b lens group moves during focusing operations.

In this case, it is preferable for the 1a lens group to include at least one negative lens that satisfies Conditional Formulae (4), (5), and (6) below. Note that it is more preferable for Conditional Formulae (4-1), (5-1), and (6-1) below to be satisfied in addition to Conditional Formulae (4), (5), and (6).

$$62 < vd1an \tag{4}$$

$$70 < vd1an < 100 \tag{4-1}$$

$$0.64 < \theta gF1an + 0.001625 \cdot vd1an < 0.7 \quad (5)$$

$$0.65 < \theta gF1an + 0.001625 - vd1an < 0.69 \quad (5\text{-}1)$$

$$3 < f1an/f1a < 7 \quad (6)$$

$$4 < f1an/f1a < 6 \quad (6\text{-}1)$$

wherein vd1an is the Abbe's number with respect to the d line of the negative lens within the 1a lens group, θgF1an is the partial dispersion of the negative lens within the 1a lens group, f1an is the focal length with respect to the d line of the negative lens within the 1a lens group, and f1a is the focal length with respect to the d line of the 1a lens group.

In addition, it is preferable for Conditional Formula (7) below to be satisfied. Note that it is more preferable for Conditional Formula (7-1) below to be satisfied.

$$12 < f1c/fw < 24 \quad (7)$$

$$14 < f1c/fw < 21 \quad (7\text{-}1)$$

wherein f1c is the focal length with respect to the d line of the 1c lens group, and fw is the focal length with respect to the d line of the entire lens system at the wide angle end.

In addition, it is preferable for Conditional Formula (8) below to be satisfied. Note that it is more preferable for Conditional Formula (8-1) below to be satisfied.

$$18 < f1b/fw < 30 \quad (8)$$

$$20 < f1b/fw < 27 \quad (8\text{-}1)$$

wherein f1b is the focal length with respect to the d line of the 1b lens group, and fw is the focal length with respect to the d line of the entire lens system at the wide angle end.

In addition, it is preferable for the 1a lens group to include at least one positive lens that satisfies Conditional Formulae (9), (10), and (11) below. Note that it is more preferable for Conditional Formulae (9-1), (10-1), and (11-1) below to be satisfied in addition to Conditional Formulae (9), (10), and (11).

$$vd1ap < 40 \quad (9)$$

$$20 < vd1ap < 39 \quad (9\text{-}1)$$

$$0.62 < \theta gF1ap + 0.001625 \cdot vd1ap < 0.67 \quad (10)$$

$$0.63 < \theta gF1ap + 0.001625 \cdot vd1ap < 0.66 \quad (10\text{-}1)$$

$$0.4 < f1ap/f1 < 2 \quad (11)$$

$$0.5 < f1ap/f1 < 1.5 \quad (11\text{-}1)$$

wherein vd1ap is the Abbe's number with respect to the d line of the positive lens within the 1a lens group, θgF1ap is the partial dispersion of the positive lens within the 1a lens group, f1ap is the focal length with respect to the d line of the positive lens within the 1a lens group, and f1 is the focal length with respect to the d line of the first lens group.

An imaging apparatus of the present disclosure is equipped with the zoom lens of the present disclosure described above.

Note that the above expression "consists of" means that lenses that practically have no power, optical elements other than lenses such as a stop, a mask, a cover glass, and filters, and mechanical components such as lens flanges, a lens barrel, an imaging element, a camera shake correcting mechanism, etc. may be included, in addition to the constituent elements listed above.

In addition, the surface shapes and the signs of the refractive powers of the lenses described above are considered in the paraxial region in cases that aspherical surfaces are included.

The zoom lens of the present disclosure consists of, in order from the object side to the image side: a first lens group having a positive refractive power; a second lens group having a positive refractive power; a third lens group having a negative refractive power; a fourth lens group having a negative refractive power; and a fifth lens group having a positive refractive power. The first lens group and the fifth lens group are fixed with respect to an image formation plane while the second lens group, the third lens group, and the fourth lens group move to change the distances among adjacent lens group when changing magnification; and Conditional Formula (1) below is satisfied. Therefore, it is possible to realize a high performance zoom lens which has a comparatively long back focus, is compact, has a wide angle of view, and favorably corrects various aberrations.

$$2.1 < DL3/DL2 < 20 \quad (1)$$

In addition, the imaging apparatus of the present disclosure is equipped with the zoom lens of the present disclosure. Therefore, the imaging apparatus of the present disclosure can be miniaturized, and is capable of obtaining wide angle images having high image quality.

BRIEF DESCRIPTION OF THE DRAWINGS

FIG. 6 is a collection of diagrams that illustrate various aberrations of the zoom lens of Example 2.

FIG. 7 is a collection of diagrams that illustrate various aberrations of the zoom lens of Example 3.

FIG. 8 is a collection of diagrams that illustrate various aberrations of the zoom lens of Example 4.

DETAILED DESCRIPTION OF THE PREFERRED EMBODIMENTS

Figure 1:
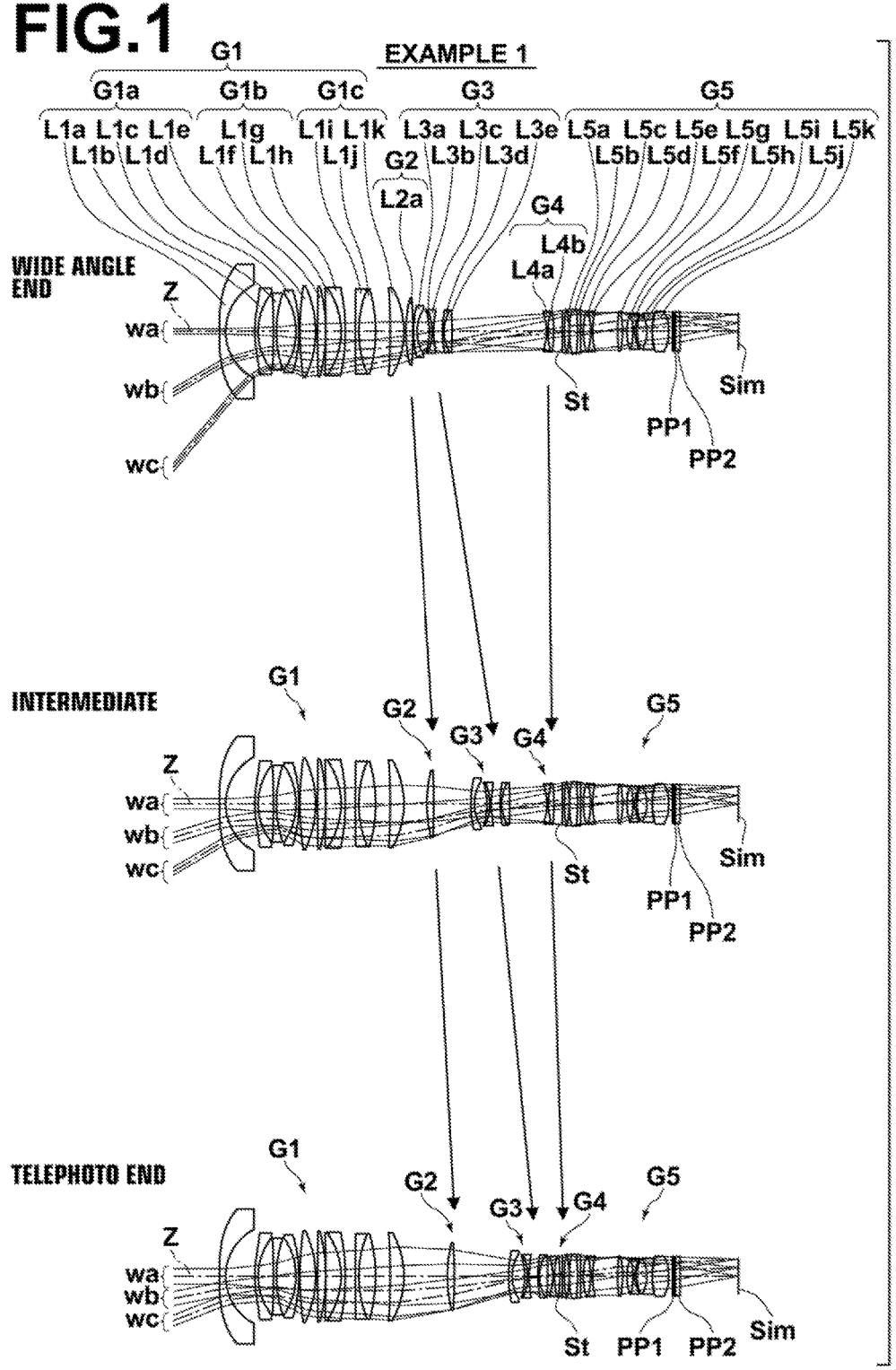
FIG. 1 is a collection of cross sectional diagrams that illustrate the lens configuration of a zoom lens according to an embodiment of the present disclosure (common with a zoom lens of Example 1).

Hereinafter, embodiments of the present disclosure will be described in detail with reference to the attached drawings. FIG. 1 is collection of cross sectional diagrams that illustrate the lens configuration of a zoom lens according to an embodiment of the present disclosure. The example of the configuration illustrated in FIG. 1 corresponds to the configuration of a zoom lens of Example 1 to be described later. In FIG. 1, the left side is the object side, and the right side is the image side. Note that the aperture stop St illustrated in FIG. 1 does not necessarily represent the size or shape thereof, but merely indicates the position of the aperture stop St along an optical axis Z. In addition, FIG. 1 also illustrates the movement trajectory of each lens group when changing magnification form the wide angle end to the telephoto end, as well as light beams at various image heights (an axial light beam wa, a light beam wb at an intermediate angle of view, and a light beam wc at a maximum angle of view).

This zoom lens of the present embodiment is constituted by, in order from the object side to the image side, a first lens group G1 having a positive refractive power; a second lens group G2 having a positive refractive power; a third lens group G3 having a negative refractive power; a fourth lens group G4 having a negative refractive power, and a fifth lens group G5 having a positive refractive power. The zoom lens is configured such that the first lens group G1 and the fifth lens group G5 are fixed with respect to an image formation plane Sim, while the second lens group G2, the third lens group G3, and the fourth lens group G4 move such that the distances among adjacent lens groups change when changing magnification.

By setting the refractive power of the lens group most toward the object side to be positive, it becomes possible to shorten the total length of the entire lens system, which is advantageous from the viewpoint of miniaturization. In addition, three lens groups being moving lens groups is advantageous from the viewpoint of suppressing fluctuations in spherical aberration and field curvature during zooming operations compared to a case in which two lens groups are moving lens groups. In addition, arranging the refractive powers of the three moving lens groups to be positive, negative, and negative in order from the object side to the image side, and distributing positive refractive power between the first lens group G1 and the second lens group G2 is advantageous from the viewpoint of miniaturization of the first lens group G1. In addition, the first lens group G1, which is provided most toward the object side, and the fifth lens group G5, which is provided most toward the image side, are fixed when changing magnification. This configuration provides the advantageous effect that the total length of the entire lens system does not change when changing magnification. In addition, setting the refractive power of the fourth lens group G4 to be negative and setting the refractive power of the fifth lens group G5 to be positive is advantageous from the viewpoint of securing back focus.

When this zoom lens is applied to an imaging apparatus, it is preferable for a cover glass, a prism, and various filters such as an infrared cutoff filter and a low pass filter to be provided between the optical system and an image formation plane Sim. Therefore, FIG. 1 illustrates an example in which parallel plate shaped optical members PP1 and PP2 that presume the presence of such components are provided between the lens system and the image formation plane Sim.

In addition, the zoom lens is configured such that Conditional Formula (1) below is satisfied. Configuring the zoom lens such that the value of DL3/DL2 is not less than or equal to the lower limit defined in Conditional Formula (1) is advantageous from the viewpoint of miniaturization of the first lens group G1. In addition, configuring the zoom lens such that the value of DL3/DL2 is not greater than or equal to the upper limit defined in Conditional Formula (1) is advantageous from the viewpoint of suppressing fluctuations in aberrations during zooming operations. Note that more favorable properties can be obtained if Conditional Formula (1-1) below is satisfied.

$$2.1 < DL3/DL2 < 20 \quad (1)$$

$$2.2 < DL3/DL2 < 17 \quad (1\text{-}1)$$

wherein DL3 is the range of movement of the third lens group, and DL2 is the range of movement of the second lens group.

In addition, in the zoom lens of the present embodiment, it is preferable for Conditional Formula (2) to be satisfied. By configuring the zoom lens such that the value of f3/f4 is not less than or equal to the lower limit defined in Conditional Formula (2), the refractive power of the third lens group G3 can be prevented from becoming excessively strong. Such a configuration is advantageous from the viewpoint of suppressing fluctuations in aberrations during zooming operations. By configuring the zoom lens such that the value of f3/f4 is not greater than or equal to the upper limit defined in Conditional Formula (2), the refractive power of the third lens group G3 can be prevented from becoming excessively weak. Such a configuration is advantageous from the viewpoint of miniaturization. Note that more favorable properties can be obtained if Conditional Formula (2-1) below is satisfied.

$$0.4 < f3/f4 < 0.8 \quad (2)$$

$$0.5 < f3/f4 < 0.7 \quad (2\text{-}1)$$

wherein f3 is the focal length with respect to the d line of the third lens group, and f4 is the focal length with respect to the d line of the fourth lens group.

In addition, it is preferable for the third lens group G3 to have two cemented lenses, for at least one of the cemented lenses to consist of a positive lens and a negative lens, and for Conditional Formula (3) below to be satisfied. Lateral chromatic aberration can be favorably corrected, by Conditional Formula (3) being satisfied. In this case, if the cemented lens provided most toward the image side within the third lens group G3 satisfies Conditional Formula (3), such a configuration is advantageous from the viewpoint of achieving a balance between longitudinal chromatic aberration and lateral chromatic aberration. Further, more favorable properties can be obtained if Conditional Formula (3-1) is satisfied.

$$0 < vd3p - vd3n < 10 \quad (3)$$

$$4 < vd3p - vd3n < 10 \quad (3\text{-}1)$$

wherein vd3p is the Abbe's number with respect to the d line of the positive lens of the cemented lens consisting of a positive lens and a negative lens within the third lens group, and vd3n is the Abbe's number with respect to the d line of the negative lens of the cemented lens consisting of a positive lens and a negative lens within the third lens group.

In addition, it is preferable for the first lens group G1 to consist of, in order from the object side to the image side: a 1a lens group G1a having a negative refractive power; a 1b lens group G1b having a positive refractive power; and a 1c lens group G1c having a positive refractive power; and for the 1a lens group G1a and the 1c lens group G1c to be fixed with respect to the image formation plane while the 1b lens group G1b moves during focusing operations. Adopting such a configuration enables changes in the angle of view during focusing operations to be suppressed.

In this case, it is preferable for the 1a lens group G1a to include at least one negative lens that satisfies Conditional Formulae (4), (5), and (6) below. Satisfying Conditional Formula (4) is advantageous from the viewpoints of correcting lateral chromatic aberration at the wide angle side and correcting longitudinal chromatic aberration at the telephoto side. Second order spectra can be favorably corrected, by Conditional Formula (5) being satisfied in addition to Conditional Formula (4). Conditional Formula (6) being satisfied enables an appropriate amount of refractive power necessary to correct chromatic aberrations to be obtained. Therefore, chromatic aberrations can be favorably corrected. Note that more favorable properties can be obtained by any one or any combination of Conditional Formulae (4-1), (5-1), and (6-1) below being satisfied in addition to Conditional Formulae (4), (5), and (6).

$$62 < vd1an \tag{4}$$

$$70 < vd1an < 100 \tag{4-1}$$

$$0.64 < \theta gF1an + 0.001625 \cdot vd1an < 0.7 \tag{5}$$

$$0.65 < \theta gF1an + 0.001625 \cdot vd1an < 0.69 \tag{5-1}$$

$$3 < f1an/f1a < 7 \tag{6}$$

$$4 < f1an/f1a < 6 \tag{6-1}$$

wherein vd1an is the Abbe's number with respect to the d line of the negative lens within the 1a lens group, θgF1an is the partial dispersion of the negative lens within the 1a lens group, f1an is the focal length with respect to the d line of the negative lens within the 1a lens group, and f1a is the focal length with respect to the d line of the 1a lens group.

In addition, it is preferable for Conditional Formula (7) below to be satisfied. By configuring the zoom lens such that the value of f1c/fw is not less than or equal to the lower limit defined in Conditional Formula (7), the refractive power of the 1c lens group G1c can be prevented from becoming excessively strong. Such a configuration is advantageous from the viewpoint of correcting spherical aberration, particularly at the telephoto side. By configuring the zoom lens such that the value of f1c/fw is not greater than or equal to the lower limit defined in Conditional Formula (7), the angles of light rays that exit the 1c lens group G1c can be prevented from becoming excessively close to parallel with respect to the optical axis. Such a configuration is advantageous from the viewpoints of suppressing an increase in the diameter of the second lens group G2, which is a moving lens group, and miniaturization. Note that more favorable properties can be obtained if Conditional Formula (7-1) below is satisfied.

$$12 < f1c/fw < 24 \tag{7}$$

$$14 < f1c/fw < 21 \tag{7-1}$$

wherein f1c is the focal length with respect to the d line of the 1c lens group, and fw is the focal length with respect to the d line of the entire lens system at the wide angle end.

In addition, it is preferable for Conditional Formula (8) below to be satisfied. By configuring the zoom lens such that the value of f1b/fw is not less than or equal to the lower limit defined in Conditional Formula (8), the refractive power of the 1b lens group G1b can be prevented from becoming excessively strong. Such a configuration is advantageous from the viewpoint of correcting spherical aberration, particularly at the telephoto side. By configuring the zoom lens such that the value of f1b/fw is not greater than or equal to the lower limit defined in Conditional Formula (8), the refractive power of the 1b lens group G1b can be prevented from becoming excessively weak. Therefore, the amount of movement when changing focus from that on an object at infinity to that on an object at a most proximal distance can be suppressed, which is advantageous from the viewpoint of miniaturization. Note that more favorable properties can be obtained if Conditional Formula (8-1) below is satisfied.

$$18 < f1b/fw < 30 \tag{8}$$

$$20 < f1b/fw < 27 \tag{8-1}$$

wherein f1b is the focal length with respect to the d line of the 1b lens group, and fw is the focal length with respect to the d line of the entire lens system at the wide angle end.

In addition, it is preferable for the 1a lens group G1a to include at least one positive lens that satisfies Conditional Formulae (9), (10), and (11) below. Satisfying Conditional Formula (9) is advantageous from the viewpoints of correcting lateral chromatic aberration at the wide angle side and correcting longitudinal chromatic aberration at the telephoto side. Second order spectra can be favorably corrected, by Conditional Formula (10) being satisfied in addition to Conditional Formula (9). Conditional Formula (11) being satisfied enables an appropriate amount of refractive power necessary to correct chromatic aberrations to be obtained. Therefore, chromatic aberrations can be favorably corrected. In addition, a configuration in which Conditional Formula (11) is satisfied is also advantageous from the viewpoints of correcting spherical aberration, field curvature, and distortion. Note that more favorable properties can be obtained by any one or any combination of Conditional Formulae (9-1), (10-1), and (11-1) below being satisfied in addition to Conditional Formulae (9), (10), and (11).

$$vd1ap < 40 \tag{9}$$

$$20 < vd1ap < 39 \tag{9-1}$$

$$0.62 < \theta gF1ap + 0.001625 \cdot vd1ap < 0.67 \tag{10}$$

$$0.63 < \theta gF1ap + 0.001625 \cdot vd1ap < 0.66 \tag{10-1}$$

$$0.4 < f1ap/f1 < 2 \tag{11}$$

$$0.5 < f1ap/f1 < 1.5 \tag{11-1}$$

wherein vd1ap is the Abbe's number with respect to the d line of the positive lens within the 1a lens group, θgF1ap is the partial dispersion of the positive lens within the 1a lens group, f1ap is the focal length with respect to the d line of the positive lens within the 1a lens group, and f1 is the focal length with respect to the d line of the first lens group.

In addition, FIG. 1 illustrates an example in which the optical members PP1 and PP2 are provided between the lens system and the image formation plane Sim. Note that various filters such as a low pass filter and a filter that cuts off specific wavelength bands may be provided among the lenses instead of being provided between the lens system and the image formation plane Sim. As a further alternative, coatings that exhibit the same effects as these filters may be administered on the lens surfaces of the lenses.

Next, examples of numerical values of the zoom lens of the present disclosure will be described.

First, a zoom lens of Example 1 will be described. FIG. 1 is a collection of cross sectional diagrams that illustrate the lens configuration of the zoom lens of Example 1. Note that in FIG. 1 and FIGS. 2 through 4 that correspond to Examples 2 through 4 to be described later, the left side is the object side and the right side is the image side. Note that the aperture stops St illustrated in FIGS. 1 through 4 do not necessarily represent the sizes and shapes thereof, but only the positions thereof along the optical axis Z. In addition, FIG. 1 illustrates the movement trajectory of each lens group when changing magnification from the wide angle end to the telephoto end, as well as light beams at various image heights (an axial light beam wa, a light beam wb at an intermediate angle of view, and a light beam we at a maximum angle of view).

The zoom lens of Example 1 is constituted by, in order from the object side to the image side, the first lens group G1 constituted by eleven lenses, which are lenses L1a through L1k, the second lens group G2 constituted by only one lens, which is a lens L2a, the third lens group G3 constituted by five lenses, which are lenses L3a through L3 e, the fourth lens group G4 constituted by two lenses, which are lenses L4a and L4b, and the fifth lens group G5 constituted by eleven lenses, which are lenses L5a through L5k.

Note that the first lens group G1 is constituted by the 1a lens group G1a constituted by five lenses, which are the lens L1a through a lens L1 e, the 1b lens group G1b constituted by three lenses, which are lenses L1f through L1h, and the 1c lens group G1c constituted by three lenses, which are a lens L1i through the lens L1k.

Basic lens data are shown in Table 1, data related to various items are shown in Table 2, data related to variable distances among surfaces are shown in Table 3, and data related to aspherical surface coefficients are shown in Table 4 for the zoom lens of Example 1. The meanings of the symbols in the tables will be described for Example 1 as an example, but the meanings are basically the same for Examples 2 through 4 as well.

In Table 1, surface numbers that sequentially increase with the surface of the constituent element most toward the object side being designated as 1 are listed in the column Surface Number; the radii of curvature of each surface are listed in the column Radius of Curvature; and distances along the optical axis Z between each surface and a surface adjacent thereto are listed in the column Distance. In addition, the refractive indices with respect to the d line (wavelength: 587.6 nm) of each constituent element are listed in the column nd; the Abbe's numbers with respect to the d line (wavelength: 587.6 nm) of each constituent element are listed in the column vd; and the partial dispersion ratios of each optical component are shown in the column θgF. Note that the partial dipersion ratio θgF is represented by the formula below.

$$\theta gF = (ng - nF)/(nF - nC)$$

wherein ng is the refractive index with respect to the g line, nF is the refractive index with respect to the F line, and nC is the refractive index with respect to the C line.

Here, the signs of the radii of curvature are positive in cases that the surface shape is convex toward the object side, and negative in cases that the surface shape is convex toward the image side. Table 1 also shows data regarding the aperture stop St and the optical members PP1 and PP2. Text reading "(Stop)" is indicated along with a surface number in the column of the surface number at the surface corresponding to the aperture stop. In addition, in Table 1, "DD [surface number]" is shown in each of the rows of distances for distances that change when changing magnification. Numerical values corresponding to the "DD [surface number]" are shown in Table 3.

The values of the zoom magnification rate, the focal length f' of the entire lens system, the F value F No., and the full angle of view 2w are shown as data related to various items in Table 2.

In the basic lens data, the data related to various items, and data related to variable distances among surfaces, degrees are used as the units for angles and mm are used as the units for lengths. However, it is possible for optical systems to be proportionately enlarged or proportionately reduced and utilized. Therefore, other appropriate units may be used.

In the lens data of Table 1, the symbol "*" is appended to the surface numbers of aspherical surfaces, and numerical values that represent the paraxial radii of curvature are shown as the radii of curvature of the aspherical surfaces. The data related to aspherical surface coefficients of Table 4 show the surface numbers of the aspherical surfaces and the aspherical surface coefficients related to the aspherical surfaces. The aspherical surface coefficients are the values of coefficients KA and Am (m=3, . . . , 20) within an aspherical surface formula represented by the formula below.

$$Zd = C \cdot h^2 / \{1 + (1 - KA \cdot C^2 \cdot h^2)^{1/2}\} + \Sigma Am \cdot h^m$$

wherein Zd is the depth of the aspherical surface (the length of a normal line from a point on the aspherical surface at a height h to a plane perpendicular to the optical axis in contact with the peak of the aspherical surface), h is height (the distance from the optical axis), C is the inverse of the paraxial radius of curvature, and KA and Am (m=3, . . . , 20) are aspherical surface coefficients.

TABLE 1

Example 1: Lens Data

| Surface Number | Radius of Curvature | Distance | nd | vd | θgF |
|---|---|---|---|---|---|
| *1 | 611.6241 | 4.999 | 1.72916 | 54.68 | 0.5445 |
| 2 | 43.0090 | 23.977 | | | |
| *3 | 84.2654 | 2.801 | 1.72916 | 54.68 | 0.5445 |
| 4 | 50.2209 | 12.669 | | | |
| 5 | −509.3035 | 2.399 | 1.90366 | 31.31 | 0.5948 |
| 6 | 97.2009 | 16.055 | | | |
| 7 | −54.7354 | 2.521 | 1.49700 | 81.54 | 0.5375 |
| 8 | −112.3395 | 0.762 | | | |
| 9 | 256.7812 | 12.899 | 1.72047 | 34.71 | 0.5835 |
| 10 | −84.7040 | DD [10] | | | |
| 11 | 1394.9826 | 6.818 | 1.56732 | 42.82 | 0.5731 |
| 12 | −142.1118 | 0.199 | | | |
| 13 | −711.9176 | 12.357 | 1.59282 | 68.62 | 0.5441 |
| 14 | −61.6355 | 3.582 | 1.91082 | 35.25 | 0.5822 |
| 15 | −165.2168 | DD [15] | | | |
| 16 | 1745.0802 | 2.999 | 1.88300 | 40.76 | 0.5668 |
| 17 | 89.7471 | 13.863 | 1.43875 | 94.66 | 0.5340 |
| 18 | −122.9182 | 12.102 | | | |
| 19 | −445.0803 | 11.148 | 1.43875 | 94.66 | 0.5340 |
| 20 | −72.0979 | DD [20] | | | |
| 21 | 115.1885 | 5.649 | 1.49700 | 81.54 | 0.5375 |
| 22 | −443.3357 | DD [22] | | | |
| *23 | 92.2350 | 2.999 | 1.59282 | 68.62 | 0.5441 |
| 24 | 34.5945 | 10.197 | | | |
| 25 | −58.0235 | 2.378 | 1.62004 | 36.26 | 0.5880 |
| 26 | −43.0353 | 1.309 | 1.61800 | 63.33 | 0.5441 |
| 27 | 90.8097 | 7.280 | | | |
| 28 | 92.2231 | 1.299 | 1.80518 | 25.42 | 0.6162 |
| 29 | 34.2804 | 6.510 | 1.80000 | 29.84 | 0.6018 |
| 30 | −507.0856 | DD [30] | | | |
| 31 | −43.9303 | 1.299 | 1.61800 | 63.33 | 0.5441 |
| 32 | 69.3453 | 4.448 | 1.59270 | 35.31 | 0.5934 |
| 33 | −128.8295 | DD [33] | | | |
| 34 (stop) | ∞ | 1.983 | | | |
| 35 | 156.3168 | 3.758 | 1.58913 | 61.13 | 0.5407 |

TABLE 1-continued

Example 1: Lens Data

| Surface Number | Radius of Curvature | Distance | nd | vd | θgF |
|---|---|---|---|---|---|
| 36 | −90.2315 | 0.149 | | | |
| 37 | 83.1206 | 6.943 | 1.80518 | 25.43 | 0.6103 |
| 38 | −124.1461 | 2.509 | 1.80440 | 39.59 | 0.5730 |
| 39 | −4631.7618 | 2.009 | | | |
| 40 | 56.0963 | 6.093 | 1.49700 | 81.54 | 0.5375 |
| 41 | −60.0790 | 1.501 | 1.78472 | 25.68 | 0.6162 |
| 42 | 57.6300 | 20.607 | | | |
| 43 | 122.6141 | 4.233 | 1.80518 | 25.43 | 0.6103 |
| 44 | −69.7199 | 3.553 | | | |
| 45 | 47.2239 | 4.986 | 1.53775 | 74.70 | 0.5394 |
| 46 | −54.5659 | 1.499 | 1.79952 | 42.22 | 0.5673 |
| 47 | 28.6533 | 1.678 | | | |
| 48 | 34.5188 | 8.160 | 1.49700 | 81.54 | 0.5375 |
| 49 | −30.7033 | 4.541 | 1.95375 | 32.32 | 0.5901 |
| 50 | 95.3450 | 0.150 | | | |
| 51 | 61.6857 | 13.401 | 1.48749 | 70.24 | 0.5301 |
| 52 | −35.7142 | 3.000 | | | |
| 53 | ∞ | 1.400 | 1.51633 | 64.14 | 0.5353 |
| 54 | ∞ | 1.000 | | | |
| 55 | ∞ | 3.690 | 1.51633 | 64.14 | 0.5353 |
| 56 | ∞ | 48.612 | | | |

TABLE 2

Example 1: Items (d line)

| | Wide Angle | Intermediate | Telephoto |
|---|---|---|---|
| Zoom Ratio | 1.00 | 1.90 | 2.94 |
| f | 12.13 | 23.05 | 35.67 |
| FNo. | 2.86 | 2.86 | 2.86 |
| 2ω (°) | 102.2 | 62.4 | 43.2 |

TABLE 3

Example 1: Zoom Distances

| | Wide Angle | Intermediate | Telephoto |
|---|---|---|---|
| DD [10] | 1.504 | 1.504 | 1.504 |
| DD [15] | 8.062 | 8.062 | 8.062 |
| DD [20] | 1.709 | 19.242 | 36.117 |
| DD [22] | 0.576 | 30.480 | 44.695 |
| DD [30] | 77.744 | 30.703 | 4.460 |
| DD [33] | 7.150 | 6.754 | 1.907 |

TABLE 4

Example 1: Aspherical Surface Coefficients

| | Surface Number | | |
|---|---|---|---|
| | 1 | 3 | 23 |
| KA | 1.00000000E+00 | 1.00000000E+00 | 1.00000000E+00 |
| A3 | −3.79267381E−06 | 7.77369253E−06 | −2.13579459E−06 |
| A4 | 3.17212640E−06 | −3.95786533E−06 | 4.41321477E−07 |
| A5 | −2.19548887E−08 | 7.34888830E−08 | −6.29270461E−09 |
| A6 | −1.02289636E−09 | −1.88238585E−09 | 3.09890218E−10 |
| A7 | 2.00288741E−12 | −1.11706885E−11 | −1.17511139E−11 |
| A8 | 6.59256187E−13 | 2.16594773E−12 | −2.39545534E−12 |
| A9 | −1.83366970E−15 | −2.71954025E−15 | 4.90811051E−14 |
| A10 | −2.07675211E−16 | −1.39995123E−15 | 1.01203142E−14 |
| A11 | 1.41466668E−19 | 2.04469973E−18 | −1.08677281E−16 |
| A12 | 3.18013714E−20 | 4.25233594E−19 | −1.36204236E−17 |
| A13 | 1.09068072E−22 | 1.99172151E−21 | −1.32500906E−19 |
| A14 | 1.01467934E−24 | 5.74342767E−23 | −6.11271642E−21 |
| A15 | −7.22594558E−27 | 6.26541679E−25 | 3.65500596E−22 |

TABLE 4-continued

Example 1: Aspherical Surface Coefficients

| | Surface Number | | |
|---|---|---|---|
| | 1 | 3 | 23 |
| A16 | −3.65147509E−28 | −3.94247984E−26 | −3.41985713E−25 |
| A17 | −1.05391228E−29 | −1.82458274E−27 | 1.81405280E−24 |
| A18 | −1.61820829E−31 | −4.30897965E−29 | 1.71039651E−26 |
| A19 | −1.00837111E−33 | −3.40391639E−31 | −8.61576912E−28 |
| A20 | 7.57841102E−35 | 4.06959794E−32 | −7.72625188E−29 |

Figure 5:
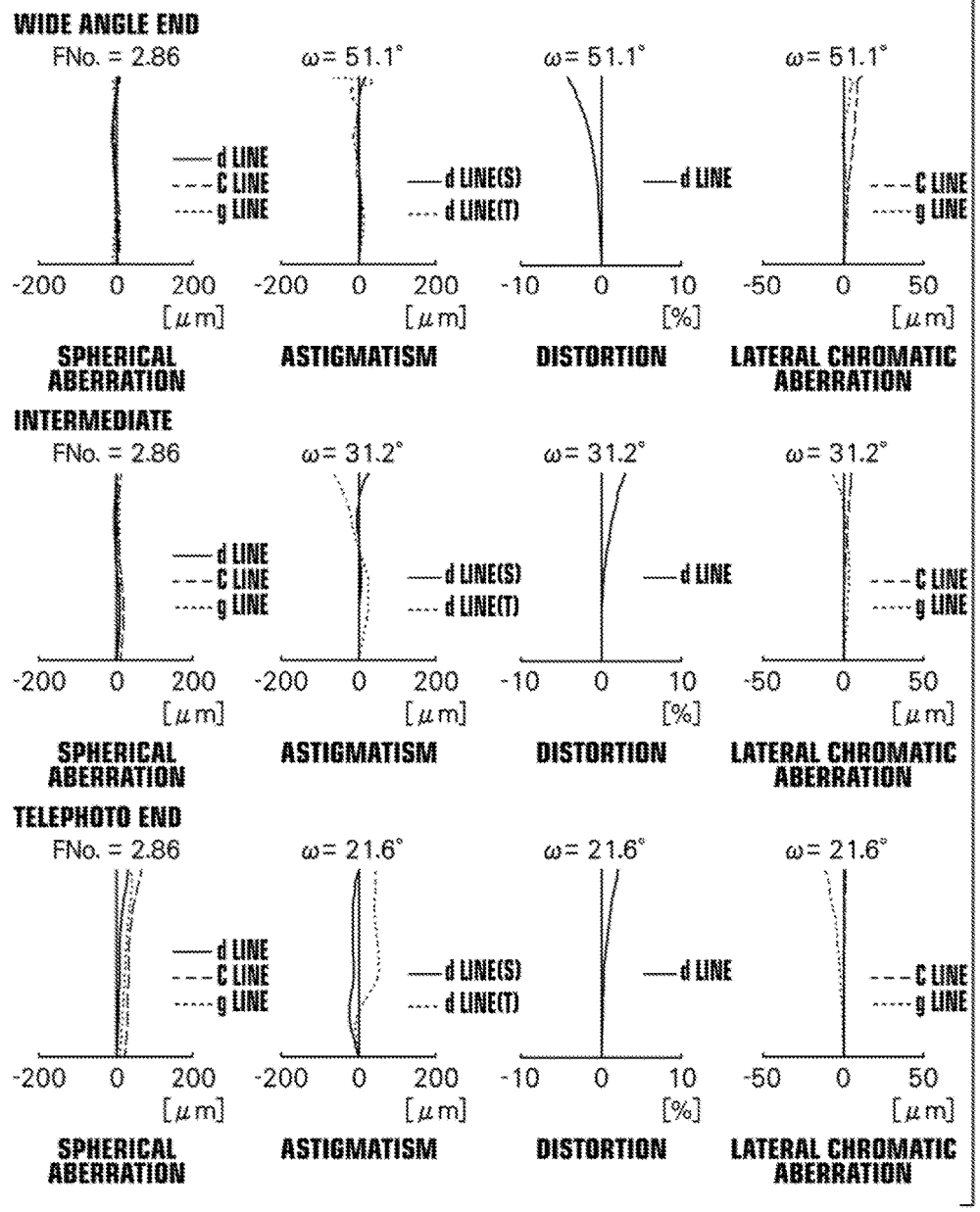
FIG. 5 is a collection of diagrams that illustrate various aberrations of the zoom lens of Example 1.

FIG. 5 is a collection of diagrams that illustrate aberrations of the zoom lens of Example 1. In the upper portion of FIG. 5, diagrams that illustrate spherical aberration, astigmatism, and lateral chromatic aberration of the zoom lens of Example 1 at the wide angle end are illustrated in this order from the left side of the drawing sheet. In the middle portion of FIG. 5, diagrams that illustrate spherical aberration, astigmatism, and lateral chromatic aberration of the zoom lens of Example 1 at an intermediate position are illustrated in this order from the left side of the drawing sheet. In the lower portion of FIG. 5, diagrams that illustrate spherical aberration, astigmatism, and lateral chromatic aberration of the zoom lens of Example 1 at the telephoto end are illustrated in this order from the left side of the drawing sheet. The diagrams that illustrate aberration are for a state in which the object distance is infinity. The diagrams that illustrate spherical aberration, astigmatism, and distortion show aberrations with the d line (wavelength: 587.6 nm) as a reference wavelength. The diagrams that illustrate spherical aberration show aberrations related to the d line (wavelength: 587.6 nm), the C line (wavelength: 656.3 nm), and the g line (wavelength: 435.8 nm) indicated by solid lines, long broken lines, and short broken lines, respectively. In the diagrams that illustrate astigmatism, aberrations in the sagittal direction and aberrations in the tangential direction are indicated by solid lines and short broken lines, respectively. In the diagrams that illustrate lateral chromatic aberration, aberrations related to the C line (wavelength: 656.3 nm) and the g line (wavelength: 435.8 nm) are indicated by long broken lines, and short broken lines, respectively. In the diagram that illustrates spherical aberration, "FNo." denotes the F number. In the other diagrams that illustrate the aberrations, w denotes half angles of view.

Figure 2:
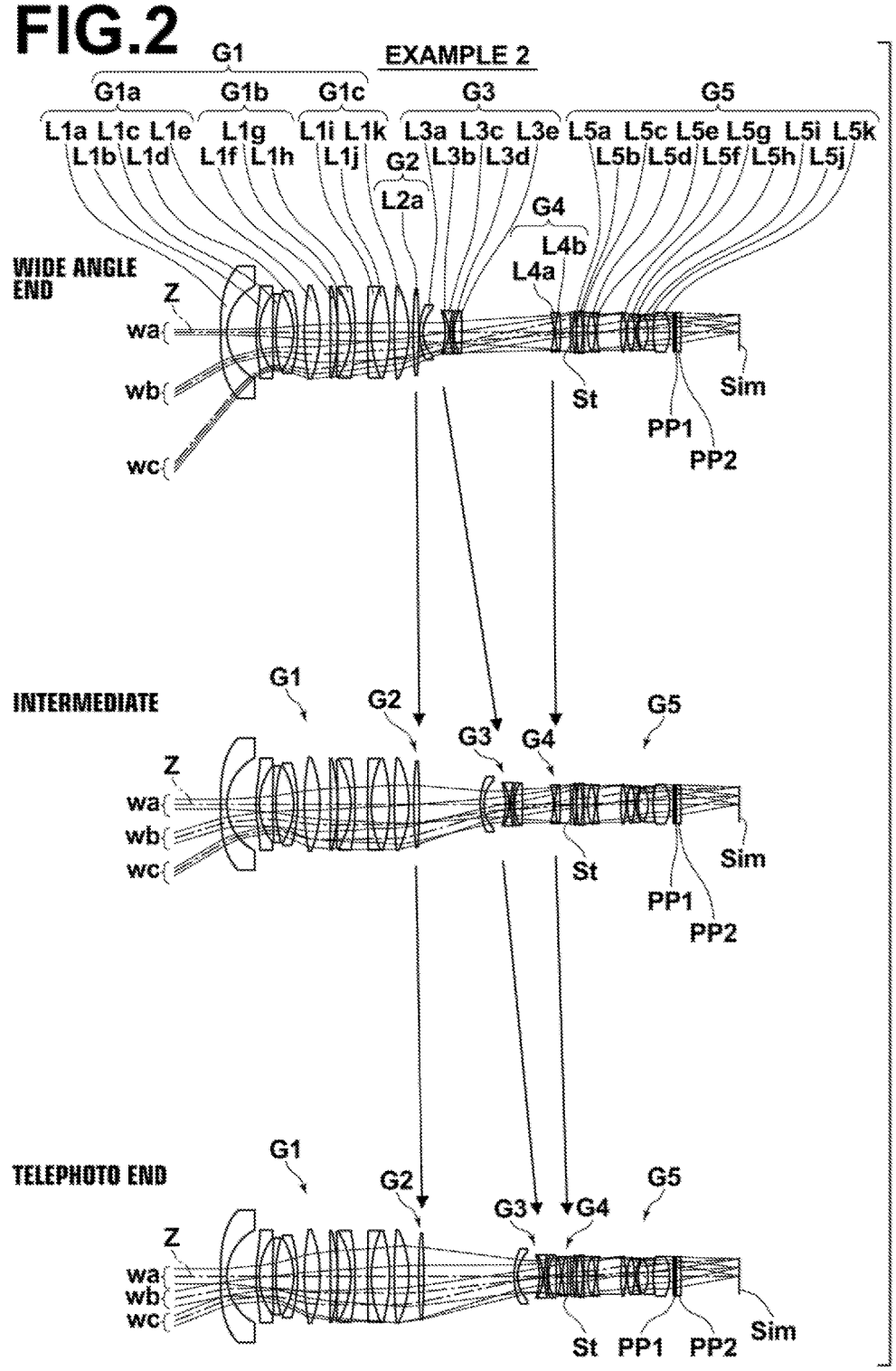
FIG. 2 is a collection of cross sectional diagrams that illustrate the lens configuration of a zoom lens according to Example 2 of the present disclosure.

Next, a zoom lens of Example 2 will be described. FIG. 2 is collection of cross sectional diagrams that illustrate the lens configuration of the zoom lens of Example 2. The zoom lens of Example 2 has the same number of lenses and the same lens configuration as the zoom lens of Example 1. Basic lens data are shown in Table 5, data related to various items are shown in Table 6, data related to variable distances among surfaces are shown in Table 7, and data related to aspherical surface coefficients are shown in Table 8 for the zoom lens of Example 2. In addition, FIG. 6 is a collection of diagrams that illustrate various aberrations of the zoom lens of Example 2.

TABLE 5

Example 2: Lens Data

| Surface Number | Radius of Curvature | Distance | nd | vd | θgF |
|---|---|---|---|---|---|
| *1 | 666.6823 | 5.000 | 1.72916 | 54.68 | 0.5445 |
| 2 | 42.7467 | 24.024 | | | |

TABLE 5-continued

Example 2: Lens Data

| Surface Number | Radius of Curvature | Distance | nd | vd | θgF |
|---|---|---|---|---|---|
| *3 | 95.0754 | 2.799 | 1.80610 | 40.93 | 0.5702 |
| 4 | 50.5817 | 11.168 | | | |
| 5 | 829.1279 | 2.400 | 1.91082 | 35.25 | 0.5822 |
| 6 | 119.1291 | 14.621 | | | |
| 7 | −58.2787 | 3.301 | 1.53775 | 74.70 | 0.5394 |
| 8 | −116.2341 | 5.532 | | | |
| 9 | 210.4026 | 12.933 | 1.64665 | 35.68 | 0.5858 |
| 10 | −105.4508 | DD [10] | | | |
| 11 | −939.8487 | 5.692 | 1.69763 | 37.46 | 0.5826 |
| 12 | −143.9374 | 0.201 | | | |
| 13 | −502.6960 | 10.617 | 1.59522 | 67.73 | 0.5443 |
| 14 | −69.9202 | 3.600 | 1.91082 | 35.25 | 0.5822 |
| 15 | −196.0975 | DD [15] | | | |
| 16 | 1224.8928 | 3.001 | 1.88300 | 40.76 | 0.5668 |
| 17 | 96.2921 | 15.047 | 1.43875 | 94.66 | 0.5340 |
| 18 | −131.1512 | 3.869 | | | |
| 19 | 424.4044 | 12.001 | 1.43875 | 94.66 | 0.5340 |
| 20 | −87.4145 | DD [20] | | | |
| 21 | 352.3454 | 4.617 | 1.49700 | 81.54 | 0.5375 |
| 22 | −537.5402 | DD [22] | | | |
| *23 | 54.6748 | 3.000 | 1.49700 | 81.54 | 0.5375 |
| 24 | 28.1791 | 18.042 | | | |
| 25 | −50.4191 | 2.754 | 1.60342 | 38.03 | 0.5836 |
| 26 | −36.2927 | 1.310 | 1.60300 | 65.44 | 0.5402 |
| 27 | 70.6131 | 1.957 | | | |
| 28 | 68.7224 | 1.299 | 1.80518 | 25.46 | 0.6157 |
| 29 | 36.5763 | 6.511 | 1.80100 | 34.97 | 0.5864 |
| 30 | −255.7170 | DD [30] | | | |
| 31 | −48.2746 | 1.300 | 1.59282 | 68.62 | 0.5441 |
| 32 | 56.5754 | 4.468 | 1.58144 | 40.75 | 0.5776 |
| 33 | −153.0068 | DD [33] | | | |
| 34 (stop) | ∞ | 2.003 | | | |
| 35 | 142.5835 | 2.951 | 1.66859 | 58.07 | 0.5426 |
| 36 | −135.2406 | 0.149 | | | |
| 37 | 90.0679 | 4.925 | 1.80519 | 25.47 | 0.6101 |
| 38 | −74.1510 | 1.211 | 1.80440 | 39.59 | 0.5730 |
| 39 | −10057.1794 | 2.967 | | | |
| 40 | 50.1513 | 6.121 | 1.49700 | 81.54 | 0.5375 |
| 41 | −58.4119 | 1.400 | 1.78929 | 25.54 | 0.6110 |
| 42 | 56.7875 | 19.859 | | | |
| 43 | 120.6065 | 4.146 | 1.80519 | 25.47 | 0.6101 |
| 44 | −65.4318 | 0.999 | | | |
| 45 | 49.6164 | 6.090 | 1.66597 | 58.20 | 0.5426 |
| 46 | −53.1161 | 1.201 | 1.88300 | 40.76 | 0.5668 |
| 47 | 28.6534 | 1.735 | | | |
| 48 | 35.2727 | 8.206 | 1.49700 | 81.54 | 0.5375 |
| 49 | −29.0312 | 4.173 | 1.95375 | 32.32 | 0.5901 |
| 50 | 95.4429 | 0.149 | | | |
| 51 | 64.7599 | 13.401 | 1.51599 | 64.39 | 0.5381 |
| 52 | −35.8213 | 3.000 | | | |
| 53 | ∞ | 1.400 | 1.51633 | 64.14 | 0.5353 |
| 54 | ∞ | 1.000 | | | |
| 55 | ∞ | 3.760 | 1.51633 | 64.14 | 0.5353 |
| 56 | ∞ | 48.570 | | | |

TABLE 6

Example 2: Items (d line)

| | Wide Angle | Intermediate | Telephoto |
|---|---|---|---|
| Zoom Ratio | 1.00 | 1.90 | 2.94 |
| f | 12.14 | 23.06 | 35.68 |
| FNo. | 2.86 | 2.86 | 2.86 |
| 2ω (°) | 101.8 | 62.4 | 43.0 |

TABLE 7

Example 2: Zoom Distances

| | Wide Angle | Intermediate | Telephoto |
|---|---|---|---|
| DD [10] | 8.850 | 8.850 | 8.850 |
| DD [15] | 10.294 | 10.294 | 10.294 |
| DD [20] | 3.529 | 4.041 | 8.119 |
| DD [22] | 1.035 | 50.393 | 74.166 |
| DD [30] | 75.611 | 25.502 | 3.756 |
| DD [33] | 8.036 | 8.275 | 2.170 |

TABLE 8

Example 2: Aspherical Surface Coefficients

| | Surface Number | | |
|---|---|---|---|
| | 1 | 3 | 23 |
| KA | 1.00000000E+00 | 1.00000000E+00 | 1.00000000E+00 |
| A3 | −3.79267381E−06 | 7.77369253E−06 | −2.13579459E−06 |
| A4 | 3.08816575E−06 | −3.63855252E−06 | 1.47163910E−06 |
| A5 | −1.60690917E−08 | 7.12912047E−08 | 1.20519166E−09 |
| A6 | −1.09429310E−09 | −2.02247919E−09 | 6.82692882E−10 |
| A7 | 1.30016770E−12 | −1.12989973E−11 | −1.07063651E−11 |
| A8 | 6.70813102E−13 | 2.09891485E−12 | −2.43084305E−12 |
| A9 | −1.58597109E−15 | −1.93010451E−15 | 5.06077625E−14 |
| A10 | −2.08942542E−16 | −1.38653907E−15 | 9.97208937E−15 |
| A11 | 1.30082612E−19 | 2.35999931E−18 | −1.07909394E−16 |
| A12 | 3.16390426E−20 | 4.26989245E−19 | −1.26730592E−17 |
| A13 | 1.07537876E−22 | 2.02816792E−21 | −1.53511762E−19 |
| A14 | 1.00223404E−24 | 5.88331353E−23 | −2.90127582E−21 |
| A15 | −7.13877311E−27 | 5.24336365E−25 | 4.91971553E−22 |
| A16 | −3.58425980E−28 | −4.23519399E−26 | 9.57551896E−24 |
| A17 | −1.04600688E−29 | −1.84128581E−27 | 1.21864288E−24 |
| A18 | −1.60608825E−31 | −4.67174622E−29 | −1.11137033E−26 |
| A19 | −9.91973045E−34 | −4.54746669E−31 | −3.17226066E−27 |
| A20 | 7.59906780E−35 | 4.89125983E−32 | 5.67978343E−29 |

Figure 3:
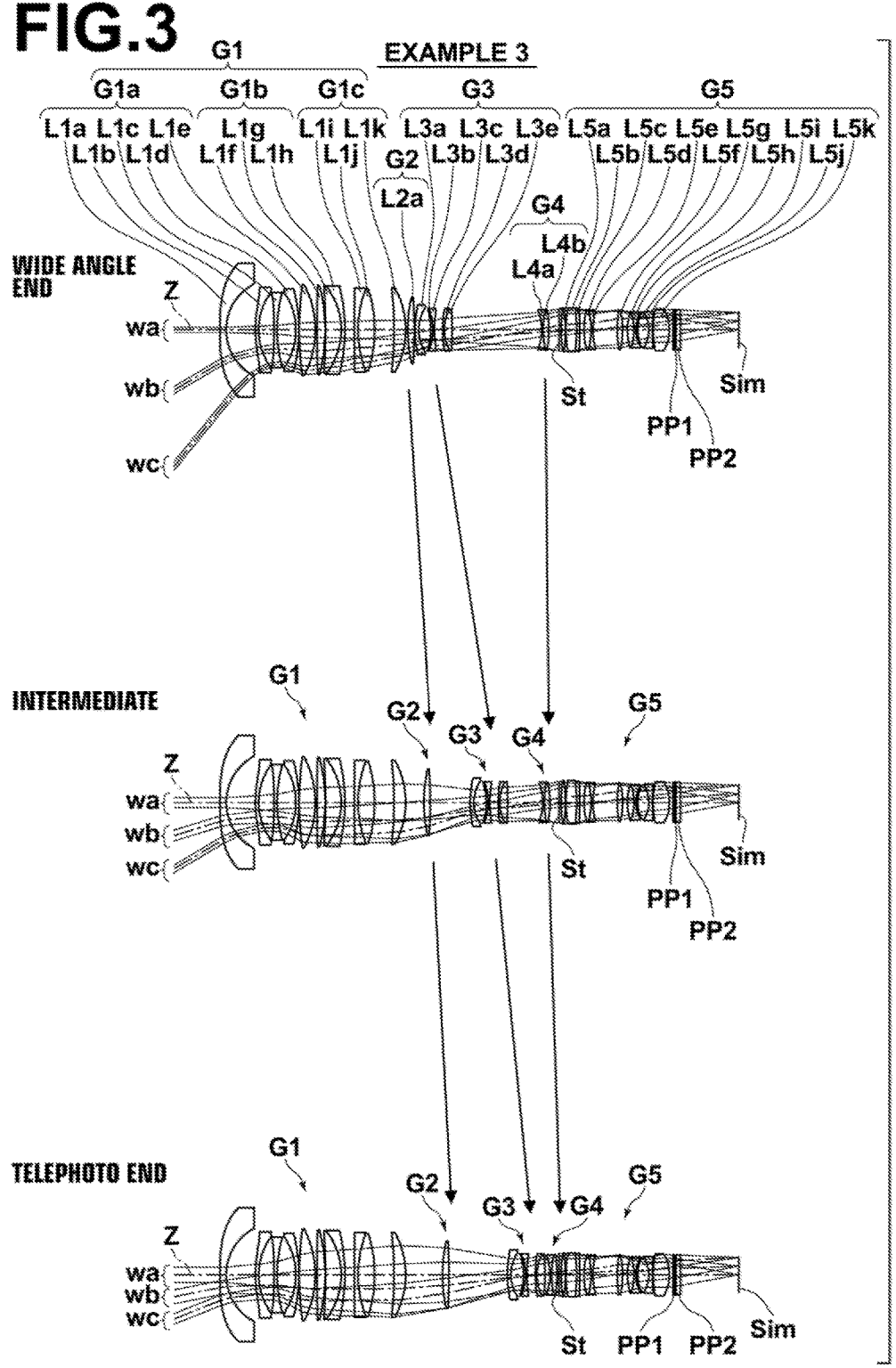
FIG. 3 is a collection of cross sectional diagrams that illustrate the lens configuration of a zoom lens according to Example 3 of the present disclosure.

Next, a zoom lens of Example 3 will be described. FIG. 3 is a collection of cross sectional diagrams that illustrate the lens configuration of the zoom lens of Example 3. The zoom lens of Example 3 has the same number of lenses and the same lens configuration as the zoom lens of Example 1. Basic lens data are shown in Table 9, data related to various items are shown in Table 10, data related to variable distances among surfaces are shown in Table 11, and data related to aspherical surface coefficients are shown in Table 12 for the zoom lens of Example 3. In addition, FIG. 7 is a collection of diagrams that illustrate various aberrations of the zoom lens of Example 3.

TABLE 9

Example 3: Lens Data

| Surface Number | Radius of Curvature | Distance | nd | vd | θgF |
|---|---|---|---|---|---|
| *1 | 720.9888 | 5.000 | 1.72916 | 54.68 | 0.5445 |
| 2 | 42.7441 | 23.981 | | | |
| *3 | 83.5774 | 2.799 | 1.72916 | 54.68 | 0.5445 |
| 4 | 52.5981 | 12.777 | | | |
| 5 | −266.3340 | 2.399 | 1.94999 | 26.16 | 0.6119 |
| 6 | 112.1747 | 15.411 | | | |
| 7 | −54.4818 | 2.499 | 1.43875 | 94.66 | 0.5340 |
| 8 | −133.2456 | 0.401 | | | |
| 9 | 290.3445 | 13.099 | 1.73800 | 32.26 | 0.5900 |
| 10 | −80.2289 | DD [10] | | | |
| 11 | 1465.2152 | 6.641 | 1.56732 | 42.82 | 0.5731 |
| 12 | −145.8072 | 0.199 | | | |
| 13 | −609.3755 | 13.031 | 1.59282 | 68.62 | 0.5441 |
| 14 | −58.3631 | 2.999 | 1.91082 | 35.25 | 0.5822 |

TABLE 9-continued

Example 3: Lens Data

| Surface Number | Radius of Curvature | Distance | nd | vd | θgF |
|---|---|---|---|---|---|
| 15 | −147.7936 | DD [15] | | | |
| 16 | 3821.7337 | 2.999 | 1.88300 | 40.76 | 0.5668 |
| 17 | 93.2323 | 13.639 | 1.43875 | 94.66 | 0.5340 |
| 18 | −108.8913 | 15.872 | | | |
| 19 | −299.8528 | 9.616 | 1.43875 | 94.66 | 0.5340 |
| 20 | −71.2398 | DD [20] | | | |
| 21 | 120.0615 | 5.467 | 1.49700 | 81.54 | 0.5375 |
| 22 | −451.7087 | DD [22] | | | |
| *23 | 93.5156 | 2.999 | 1.59282 | 68.62 | 0.5441 |
| 24 | 32.9359 | 10.172 | | | |
| 25 | −51.8309 | 1.732 | 1.62004 | 36.26 | 0.5880 |
| 26 | −45.0164 | 1.310 | 1.61800 | 63.33 | 0.5441 |
| 27 | 116.5947 | 6.772 | | | |
| 28 | 101.3784 | 1.299 | 1.80518 | 25.42 | 0.6162 |
| 29 | 34.9315 | 6.511 | 1.80000 | 29.84 | 0.6018 |
| 30 | −257.9508 | DD [30] | | | |
| 31 | −43.7192 | 1.300 | 1.61800 | 63.33 | 0.5441 |
| 32 | 78.5468 | 4.486 | 1.59270 | 35.31 | 0.5934 |
| 33 | −104.8622 | DD [33] | | | |
| 34 (stop) | ∞ | 1.866 | | | |
| 35 | 141.5395 | 3.506 | 1.58913 | 61.13 | 0.5407 |
| 36 | −114.6360 | 0.149 | | | |
| 37 | 83.3614 | 8.900 | 1.80518 | 25.43 | 0.6103 |
| 38 | −171.9012 | 2.511 | 1.80440 | 39.59 | 0.5730 |
| 39 | −3427.6730 | 3.576 | | | |
| 40 | 60.3173 | 5.901 | 1.49700 | 81.54 | 0.5375 |
| 41 | −58.8661 | 1.499 | 1.78472 | 25.68 | 0.6162 |
| 42 | 59.6604 | 20.140 | | | |
| 43 | 128.7780 | 4.283 | 1.80518 | 25.43 | 0.6103 |
| 44 | −67.9375 | 4.037 | | | |
| 45 | 51.9878 | 5.349 | 1.53775 | 74.70 | 0.5394 |
| 46 | −46.1818 | 1.500 | 1.79952 | 42.22 | 0.5673 |
| 47 | 27.8391 | 1.562 | | | |
| 48 | 32.1332 | 9.054 | 1.49700 | 81.54 | 0.5375 |
| 49 | −28.3436 | 3.022 | 1.95375 | 32.32 | 0.5901 |
| 50 | 175.1794 | 0.623 | | | |
| 51 | 80.5048 | 13.401 | 1.48749 | 70.24 | 0.5301 |
| 52 | −33.5185 | 3.000 | | | |
| 53 | ∞ | 1.400 | 1.51633 | 64.14 | 0.5353 |
| 54 | ∞ | 1.000 | | | |
| 55 | ∞ | 3.690 | 1.51633 | 64.14 | 0.5353 |
| 56 | ∞ | 48.419 | | | |

TABLE 10

Example 3: Items (d line)

| | Wide Angle | Intermediate | Telephoto |
|---|---|---|---|
| Zoom Ratio | 1.00 | 1.90 | 2.94 |
| f | 12.13 | 23.04 | 35.65 |
| FNo. | 2.86 | 2.86 | 2.86 |
| 2ω (°) | 102.2 | 62.4 | 43.2 |

TABLE 11

Example 3: Zoom Distances

| | Wide Angle | Intermediate | Telephoto |
|---|---|---|---|
| DD [10] | 1.505 | 1.505 | 1.505 |
| DD [15] | 7.920 | 7.920 | 7.920 |
| DD [20] | 1.676 | 14.922 | 30.572 |
| DD [22] | 0.616 | 33.096 | 48.007 |
| DD [30] | 73.706 | 28.864 | 4.272 |
| DD [33] | 8.510 | 7.626 | 1.657 |

TABLE 12

Example 3: Aspherical Surface Coefficients

| | Surface Number | | |
|---|---|---|---|
| | 1 | 3 | 23 |
| KA | 1.00000000E+00 | 1.00000000E+00 | 1.00000000E+00 |
| A3 | −3.79267381E−06 | 7.77369253E−06 | −2.13579459E−06 |
| A4 | 3.43124383E−06 | −4.31934600E−06 | 6.34919063E−07 |
| A5 | −2.82099665E−08 | 7.29270735E−08 | −6.46247210E−09 |
| A6 | −9.69191271E−10 | −1.90075033E−09 | 2.98634441E−10 |
| A7 | 1.44954007E−12 | −1.06709266E−11 | −1.11021290E−11 |
| A8 | 6.82544312E−13 | 2.20452609E−12 | −2.36981658E−12 |
| A9 | −1.95746128E−15 | −3.01462331E−15 | 5.22583969E−14 |
| A10 | −2.09263407E−16 | −1.40430171E−15 | 1.01305617E−14 |
| A11 | 1.33557677E−19 | 1.85488134E−18 | −1.17022067E−16 |
| A12 | 3.17782734E−20 | 4.22528921E−19 | −1.39802644E−17 |
| A13 | 1.10805778E−22 | 1.96374712E−21 | −1.91863981E−19 |
| A14 | 1.04653083E−24 | 5.63814969E−23 | −6.29926869E−21 |
| A15 | −6.73207866E−27 | 6.71959911E−25 | 3.81827537E−22 |
| A16 | −3.59209165E−28 | −3.84742212E−26 | 2.56475274E−24 |
| A17 | −1.04582542E−29 | −1.77779559E−27 | 2.43128708E−24 |
| A18 | −1.61161149E−31 | −4.20176418E−29 | 1.08598630E−26 |
| A19 | −1.00927738E−33 | −3.45319852E−31 | −5.52864322E−28 |
| A20 | 7.56465850E−35 | 3.99789994E−32 | −1.24533336E−28 |

Figure 4:
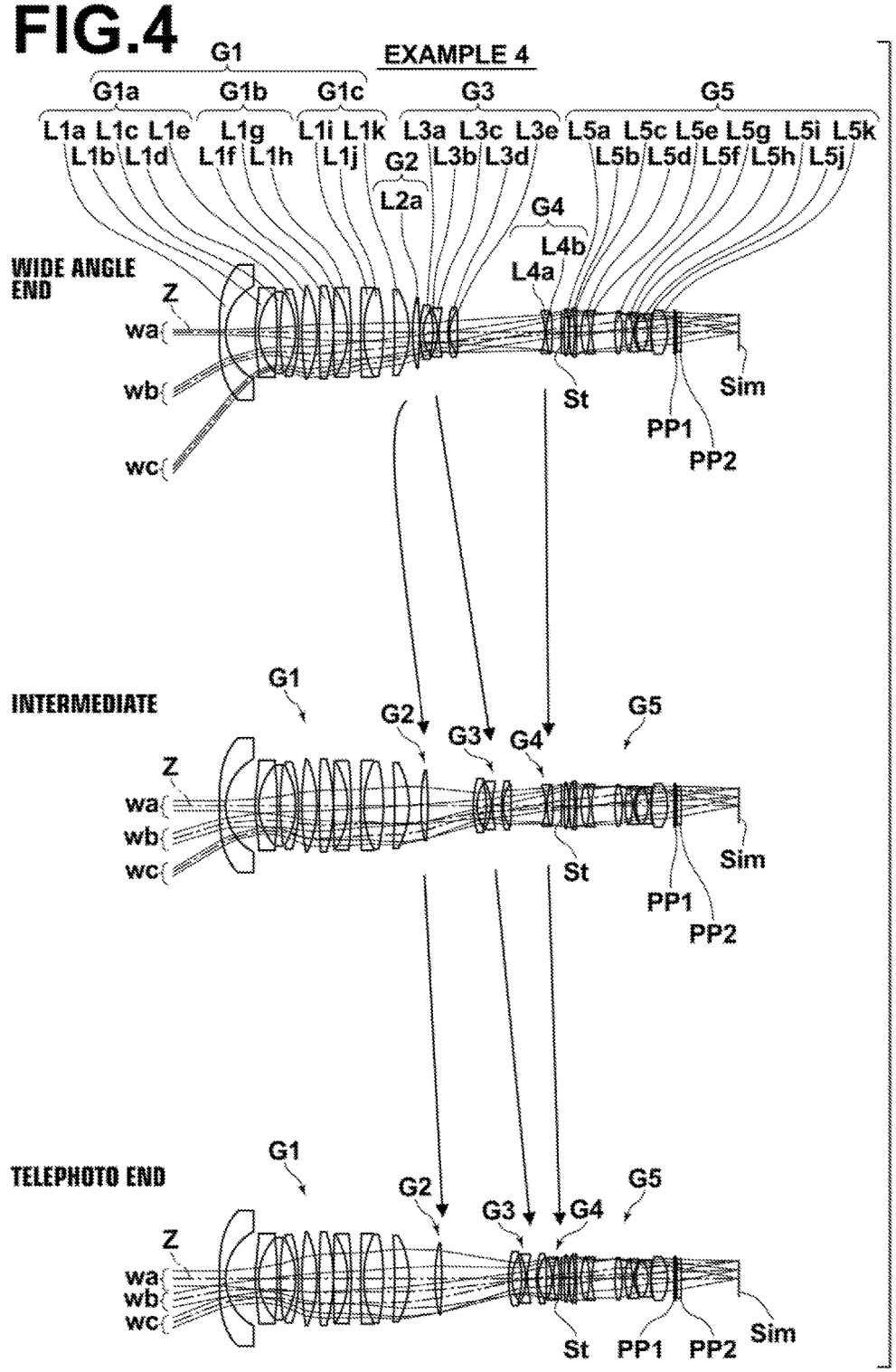
FIG. 4 is a collection of cross sectional diagrams that illustrate the lens configuration of a zoom lens according to Example 4 of the present disclosure.

Next, a zoom lens of Example 4 will be described. FIG. 4 is a collection of cross sectional diagrams that illustrate the lens configuration of the zoom lens of Example 4. The zoom lens of Example 4 has the same number of lenses and the same lens configuration as the zoom lens of Example 1. Basic lens data are shown in Table 13, data related to various items are shown in Table 14, data related to variable distances among surfaces are shown in Table 15, and data related to aspherical surface coefficients are shown in Table 16 for the zoom lens of Example 4. In addition, FIG. 8 is a collection of diagrams that illustrate various aberrations of the zoom lens of Example 4.

TABLE 13

Example 4: Lens Data

| Surface Number | Radius of Curvature | Distance | nd | vd | θgF |
|---|---|---|---|---|---|
| *1 | 620.0124 | 5.001 | 1.72916 | 54.68 | 0.5445 |
| 2 | 43.1045 | 24.410 | | | |
| *3 | 110.7421 | 2.800 | 1.80610 | 40.93 | 0.5702 |
| 4 | 47.2896 | 15.057 | | | |
| 5 | −308.2095 | 2.524 | 1.91082 | 35.25 | 0.5822 |
| 6 | 221.2196 | 12.659 | | | |
| 7 | −62.3975 | 2.500 | 1.53775 | 74.70 | 0.5394 |
| 8 | −116.9980 | 2.581 | | | |
| 9 | 229.8331 | 12.373 | 1.72047 | 34.71 | 0.5835 |
| 10 | −94.4939 | DD [10] | | | |
| 11 | 645.1587 | 11.435 | 1.56732 | 42.82 | 0.5731 |
| 12 | −129.4768 | 0.200 | | | |
| 13 | 1096.1308 | 11.572 | 1.59282 | 68.62 | 0.5441 |
| 14 | −69.0840 | 2.908 | 1.91082 | 35.25 | 0.5822 |
| 15 | −326.8838 | DD [15] | | | |
| 16 | 908.1935 | 2.650 | 1.88300 | 40.76 | 0.5668 |
| 17 | 83.3310 | 16.154 | 1.43875 | 94.66 | 0.5340 |
| 18 | −161.0353 | 9.149 | | | |
| 19 | −478.9183 | 11.842 | 1.43875 | 94.66 | 0.5340 |
| 20 | −72.8359 | DD [20] | | | |
| 21 | 129.4863 | 5.514 | 1.49700 | 81.54 | 0.5375 |
| 22 | −367.6692 | DD [22] | | | |
| *23 | 78.7279 | 3.000 | 1.59282 | 68.62 | 0.5441 |
| 24 | 34.3649 | 7.681 | | | |
| 25 | −67.3423 | 3.591 | 1.62004 | 36.26 | 0.5880 |
| 26 | −41.6530 | 1.309 | 1.61800 | 63.33 | 0.5441 |
| 27 | 68.0011 | 7.457 | | | |
| 28 | 75.3447 | 1.301 | 1.74077 | 27.79 | 0.6096 |
| 29 | 30.4950 | 6.500 | 1.73800 | 32.26 | 0.5900 |
| 30 | −1340.9778 | DD [30] | | | |

TABLE 13-continued

Example 4: Lens Data

| Surface Number | Radius of Curvature | Distance | nd | vd | θgF |
|---|---|---|---|---|---|
| 31 | −43.0976 | 1.301 | 1.61800 | 63.33 | 0.5441 |
| 32 | 61.6660 | 4.749 | 1.59270 | 35.31 | 0.5934 |
| 33 | −124.7213 | DD [33] | | | |
| 34 (stop) | ∞ | 2.131 | | | |
| 35 | 181.9135 | 3.956 | 1.59522 | 67.73 | 0.5443 |
| 36 | −93.4507 | 0.151 | | | |
| 37 | 94.8331 | 4.558 | 1.80518 | 25.43 | 0.6103 |
| 38 | −118.4030 | 1.510 | 1.80440 | 39.59 | 0.5730 |
| 39 | −902.1238 | 3.814 | | | |
| 40 | 51.9558 | 6.819 | 1.49700 | 81.54 | 0.5375 |
| 41 | −61.8300 | 1.999 | 1.78472 | 25.68 | 0.6162 |
| 42 | 58.5434 | 19.036 | | | |
| 43 | 116.6437 | 5.826 | 1.80518 | 25.43 | 0.6103 |
| 44 | −70.4189 | 2.436 | | | |
| 45 | 53.3390 | 5.864 | 1.59282 | 68.62 | 0.5441 |
| 46 | −53.3390 | 1.495 | 1.83481 | 42.72 | 0.5649 |
| 47 | 28.9062 | 1.694 | | | |
| 48 | 34.9661 | 9.693 | 1.49700 | 81.54 | 0.5375 |
| 49 | −29.3610 | 2.286 | 1.95375 | 32.32 | 0.5901 |
| 50 | 124.4152 | 0.353 | | | |
| 51 | 67.1748 | 13.400 | 1.48749 | 70.24 | 0.5301 |
| 52 | −35.7166 | 5.000 | | | |
| 53 | ∞ | 1.400 | 1.51633 | 64.14 | 0.5353 |
| 54 | ∞ | 1.000 | | | |
| 55 | ∞ | 3.690 | 1.51633 | 64.14 | 0.5353 |
| 56 | ∞ | 47.645 | | | |

TABLE 14

Example 4: Items (d line)

| | Wide Angle | Intermediate | Telephoto |
|---|---|---|---|
| Zoom Ratio | 1.00 | 1.90 | 2.94 |
| f | 12.12 | 23.03 | 35.63 |
| FNo. | 2.85 | 2.85 | 2.85 |
| 2ω (°) | 102.0 | 62.6 | 43.2 |

TABLE 15

Example 4: Zoom Distances

| | Wide Angle | Intermediate | Telephoto |
|---|---|---|---|
| DD [10] | 1.944 | 1.944 | 1.944 |
| DD [15] | 7.604 | 7.604 | 7.604 |
| DD [20] | 2.993 | 10.043 | 21.618 |
| DD [22] | 0.788 | 37.418 | 54.615 |
| DD [30] | 71.396 | 28.361 | 4.619 |
| DD [33] | 7.554 | 6.908 | 1.879 |

TABLE 16

Example 4: Aspherical Surface Coefficients

| | Surface Number | | |
|---|---|---|---|
| | 1 | 3 | 23 |
| KA | 1.00000000E+00 | 1.00000000E+00 | 1.00000000E+00 |
| A3 | −3.79267381E−06 | 7.77369253E−06 | −2.13579459E−06 |
| A4 | 3.05396688E−06 | −3.53726191E−06 | 4.67377256E−07 |
| A5 | −1.58949456E−08 | 7.25905827E−08 | −1.03930108E−08 |
| A6 | −1.11778765E−09 | −1.94634143E−09 | 2.33349715E−10 |
| A7 | 2.88140472E−12 | −1.01626981E−11 | 5.30322938E−12 |
| A8 | 6.55805075E−13 | 2.17411825E−12 | −1.71572287E−12 |
| A9 | −1.89633398E−15 | −2.35603476E−15 | 1.81844609E−14 |
| A10 | −2.06015119E−16 | −1.41174817E−15 | 8.58816477E−15 |

TABLE 16-continued

Example 4: Aspherical Surface Coefficients

| | Surface Number | | |
|---|---|---|---|
| | 1 | 3 | 23 |
| A11 | 1.60603752E−19 | 1.82716729E−18 | −1.32452870E−16 |
| A12 | 3.20087757E−20 | 4.18204047E−19 | −1.30195079E−17 |
| A13 | 9.54541440E−23 | 1.85900170E−21 | −5.40768220E−20 |
| A14 | 1.07311109E−24 | 5.35431955E−23 | −4.88866480E−21 |
| A15 | −6.57878596E−27 | 6.68557294E−25 | 4.15495783E−22 |
| A16 | −3.39223115E−28 | −3.57771926E−26 | 4.02031048E−23 |
| A17 | −1.12469968E−29 | −1.78996826E−27 | 5.56385014E−25 |
| A18 | −1.58539863E−31 | −3.93402007E−29 | −2.78067849E−26 |
| A19 | −9.74722274E−34 | −2.05853915E−31 | −1.38439284E−27 |
| A20 | 7.62412059E−35 | 3.69864088E−32 | −2.74220828E−29 |

Table 17 shows values corresponding to Conditional Formulae (1) through (11) for the zoom lenses of Examples 1 through 4. Note that all of the Examples use the d line as a reference wavelength, and the values shown in Table 17 below are those for the reference wavelength.

TABLE 17

| Formula | Condition | Example 1 | Example 2 | Example 3 | Example 4 |
|---|---|---|---|---|---|
| (1) | DL3/DL2 | 2.283 | 16.917 | 2.640 | 3.639 |
| (2) | f3/f4 | 0.601 | 0.643 | 0.545 | 0.627 |
| (3) | vd3p − vd3n | 4.42 | 9.51 | 4.42 | 4.47 |
| (4) | vd1an | 81.54 | 74.70 | 94.66 | 74.70 |
| (5) | θgF1an + 0.001625 × vd1an | 0.6700 | 0.6607 | 0.6878 | 0.6607 |
| (6) | f1an/f1a | 4.721 | 4.678 | 4.621 | 5.253 |
| (7) | f1c/fw | 17.462 | 14.052 | 17.676 | 20.397 |
| (8) | f1b/fw | 21.033 | 26.820 | 20.548 | 20.439 |
| (9) | vd1ap | 34.71 | 35.68 | 32.26 | 34.71 |
| (10) | θgF1ap + 0.001625 × vd1ap | 0.6399 | 0.6438 | 0.6424 | 0.6399 |
| (11) | f1ap/f1 | 0.682 | 1.234 | 0.656 | 0.596 |

As can be understood from the above data, all of the zoom lenses of Examples 1 through 4 satisfy Conditional Formulae (1) through (11), and are zoom lenses having comparatively long back focuses with the values of Br/fw being 1 or greater, are compact with the values of total length/image size being 35 or less, have wide angles of view with the values of the half angle of view at the wide angle end being 40 degrees or greater, and high performance with various aberrations being favorably corrected.

Figure 9:
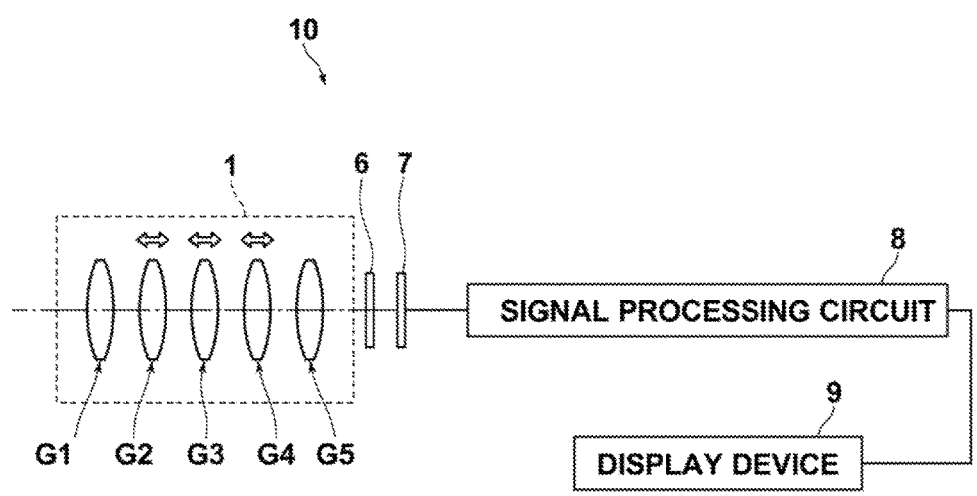
FIG. 9 is a diagram that schematically illustrates an imaging apparatus according to an embodiment of the present disclosure.

Next, an imaging apparatus according to an embodiment of the present disclosure will be described. FIG. 9 is a diagram that illustrates the schematic structure an imaging apparatus that employs a zoom lens according to an embodiment of the present disclosure as an example of an imaging apparatus of the present disclosure. Note that each of the lens groups is schematically illustrated in FIG. 15. The imaging apparatus may be a video camera, a digital still camera, or the like which is equipped with a solid state imaging element such as a CCD (Charge Coupled Device) and a CMOS (Complementary Metal Oxide Semiconductor), for example.

The imaging apparatus 10 illustrated in FIG. 9 is equipped with a zoom lens 1, a filter 6 that functions as a low pass filter or the like, provided at the image side of the zoom lens 1, an imaging element 7 provided at the image side of the filter 6, and a signal processing circuit 8. The imaging element 7 converts optical images formed by the zoom lens 1 into electrical signals. A CCD, a CMOS, or the like may be employed as the imaging element 7. The imaging element 7 is provided such that the image capturing surface thereof matches the image formation plane of the zoom lens 1.

Images obtained through the zoom lens 1 are formed on the image capturing surface of the imaging element 7. Output signals related to these images are processed by the signal processing circuit 8, and the images are displayed by a display device 9.

The imaging apparatus 10 of the present embodiment is equipped with the zoom lens 1 of the present disclosure. Therefore, the imaging apparatus 10 is capable of obtaining wide angle images having high image quality.

The present disclosure has been described with reference to the embodiments and Examples. However, the present disclosure is not limited to the above embodiments and Examples, and various modifications are possible. For example, the numerical values of the radii of curvature, the distances among surfaces, the refractive indices, the Abbe's numbers, etc. of the lens components are not limited to those exemplified in the above Examples, and may be different values.

What is claimed is:

1. A zoom lens consisting of, in order from the object side to the image side:
    a first lens group having a positive refractive power;
    a second lens group having a positive refractive power;
    a third lens group having a negative refractive power;
    a fourth lens group having a negative refractive power; and
    a fifth lens group having a positive refractive power;
    the first lens group and the fifth lens group being fixed with respect to an image formation plane while the second lens group, the third lens group, and the fourth lens group move to change the distances among adjacent lens group when changing magnification; and
    Conditional Formula (1) below being satisfied:

$$2.1 < DL3/DL2 < 20 \tag{1}$$

wherein DL3 is the range of movement of the third lens group, and DL2 is the range of movement of the second lens group.

2. A zoom lens as defined in claim 1, in which Conditional Formula (2) below is satisfied:

$$0.4 < f3/f4 < 0.8 \tag{2}$$

wherein f3 is the focal length with respect to the d line of the third lens group, and f4 is the focal length with respect to the d line of the fourth lens group.

3. A zoom lens as defined in claim 2, in which Conditional Formula (2-1) below is satisfied:

$$0.5 < f3/f4 < 0.7 \tag{2-1}$$

4. A zoom lens as defined in claim 1, wherein:
    the third lens group has have two cemented lenses;
    at least one of the cemented lenses consists of a positive lens and a negative lens; and
    Conditional Formula (3) below is satisfied:

$$0 < vd3p - vd3n < 10 \tag{3}$$

wherein vd3p is the Abbe's number with respect to the d line of the positive lens of the cemented lens consisting of a positive lens and a negative lens within the third lens group, and vd3p is the Abbe's number with respect to the d line of the negative lens of the cemented lens consisting of a positive lens and a negative lens within the third lens group.

5. A zoom lens as defined in claim 4, wherein:
    the cemented lens provided most toward the image side within the third lens group satisfies Conditional Formula (3).

6. A zoom lens as defined in claim 4, in which Conditional Formula (3-1) below is satisfied:

$$4 < vd3p - vd3n < 10 \tag{3-1}$$

7. A zoom lens as defined in claim 1, wherein:
    the first lens group consists of, in order from the object side to the image side: a 1a lens group having a negative refractive power; a 1b lens group having a positive refractive power; and a 1c lens group having a positive refractive power; and
    the 1a lens group and the 1c lens group are fixed with respect to the image formation plane while the 1b lens group moves during focusing operations.

8. A zoom lens as defined in claim 7, wherein:
    the 1a lens group includes at least one negative lens that satisfies Conditional Formulae (4), (5), and (6) below:

$$62 < vd1an \tag{4}$$

$$0.64 < \theta gF1an + 0.001625 \cdot vd1an < 0.7 \tag{5}$$

$$3 < f1an/f1a < 7 \tag{6}$$

wherein vd1an is the Abbe's number with respect to the d line of the negative lens within the 1a lens group, $\theta gF1an$ is the partial dispersion of the negative lens within the 1a lens group, f1an is the focal length with respect to the d line of the negative lens within the 1a lens group, and f1a is the focal length with respect to the d line of the 1a lens group.

9. A zoom lens as defined in claim 8, in which at least one of Conditional Formulae (4-1), (5-1), and (6-1) below is satisfied:

$$70 < vd1an < 100 \tag{4-1}$$

$$0.65 < \theta gF1an + 0.001625 \cdot vd1an < 0.69 \tag{5-1}$$

$$4 < f1an/f1a < 6 \tag{6-1}$$

10. A zoom lens as defined in claim 7, in which Conditional Formula (7) below is satisfied:

$$12 < f1c/fw < 24 \tag{7}$$

wherein f1c is the focal length with respect to the d line of the 1c lens group, and fw is the focal length with respect to the d line of the entire lens system at the wide angle end.

11. A zoom lens as defined in claim 10, in which Conditional Formula (7) below is satisfied:

$$14 < f1c/fw < 21 \tag{7-1}$$

12. A zoom lens as defined in claim 7, in which Conditional Formula (8) below is satisfied:

$$18 < f1b/fw < 30 \tag{8}$$

wherein f1b is the focal length with respect to the d line of the 1b lens group, and fw is the focal length with respect to the d line of the entire lens system at the wide angle end.

13. A zoom lens as defined in claim 12, in which Conditional Formula (8) below is satisfied:

$$20 < f1b/fw < 27 \tag{8-1}$$

14. A zoom lens as defined in claim 7, wherein:

the 1a lens group includes at least one positive lens that satisfies Conditional Formulae (9), (10), and (11) below:

$$vd1ap < 40 \quad (9)$$

$$0.62 < \theta gF1ap + 0.001625 \cdot vd1ap < 0.67 \quad (10)$$

$$0.4 < f1ap/f1 < 2 \quad (11)$$

wherein vd1ap is the Abbe's number with respect to the d line of the positive lens within the 1a lens group, θgF1ap is the partial dispersion of the positive lens within the 1a lens group, f1ap is the focal length with respect to the d line of the positive lens within the 1a lens group, and f1 is the focal length with respect to the d line of the first lens group.

15. A zoom lens as defined in claim 14, in which at least one of Conditional Formulae (9-1), (10-1), and (11-1) below is satisfied:

$$20 < vd1ap < 39 \quad (9\text{-}1)$$

$$0.63 < \theta gF1ap + 0.001625 \cdot vd1ap < 0.66 \quad (10\text{-}1)$$

$$0.5 < f1ap/f1 < 1.5 \quad (11\text{-}1).$$

16. A zoom lens as defined in claim 1, in which Conditional Formula (1-1) below is satisfied:

$$2.2 < DL3/DL2 < 17 \quad (1\text{-}1).$$

17. An imaging apparatus equipped with a zoom lens as defined in claim 1.

\* \* \* \* \*